(12) United States Patent
Lo et al.

(10) Patent No.: US 10,061,353 B2
(45) Date of Patent: Aug. 28, 2018

(54) DOCKING STATIONS

(71) Applicant: HEWLETT-PACKARD DEVELOPMENT COMPANY, L.P., Houston, TX (US)

(72) Inventors: Jose Ticy Lo, Houston, TX (US); Paul Roberto Lalinde, Houston, TX (US); Chan Park, Houston, TX (US); Tony Moon, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/563,975

(22) PCT Filed: Jun. 5, 2015

(86) PCT No.: PCT/US2015/034456
§ 371 (c)(1),
(2) Date: Oct. 3, 2017

(87) PCT Pub. No.: WO2016/195711
PCT Pub. Date: Dec. 8, 2016

(65) Prior Publication Data
US 2018/0136695 A1    May 17, 2018

(51) Int. Cl.
| | |
|---|---|
| *G06F 1/16* | (2006.01) |
| *H04R 1/02* | (2006.01) |
| *H02J 7/00* | (2006.01) |
| *F16M 13/00* | (2006.01) |
| *H01R 13/639* | (2006.01) |
| *H01R 31/06* | (2006.01) |
| *H01R 33/94* | (2006.01) |
| *H04M 1/04* | (2006.01) |

(52) U.S. Cl.
CPC .......... *G06F 1/1632* (2013.01); *F16M 13/00* (2013.01); *G06F 1/1626* (2013.01); *H01R 13/639* (2013.01); *H01R 31/06* (2013.01); *H02J 7/0044* (2013.01); *H04R 1/02* (2013.01); *G09G 2340/0492* (2013.01); *H01R 33/94* (2013.01); *H04M 1/04* (2013.01)

(58) Field of Classification Search
None
See application file for complete search history.

(56) References Cited

U.S. PATENT DOCUMENTS 7,719,830 B2    5/2010    Howarth et al.
7,742,293 B2    6/2010    Strauser
(Continued)

FOREIGN PATENT DOCUMENTS

CN    203968300    11/2014

OTHER PUBLICATIONS

Garrett; "Quirky Perch—Multi Phone Travel Dock with Removable Bluetooth Speaker"; Jan. 10, 2011; 4 pages.
(Continued)

*Primary Examiner* — Xanthia C Cunningham
(74) *Attorney, Agent, or Firm* — HPI Patent Department

(57) ABSTRACT

An example device docking station may comprise a base cradle and a rotatable block to engage with the base cradle in multiple set positions to define an insertion slot having a varying width to engage with an electronic device. The insertion slot may have a different width in at least one of the multiple set positions from another of the multiple set positions.

13 Claims, 4 Drawing Sheets

(56) References Cited

U.S. PATENT DOCUMENTS

| | | | |
|---|---|---|---|
| 7,800,896 B2* | 9/2010 | Takizawa | G06F 1/1601 |
| | | | 361/679.41 |
| 8,670,230 B2* | 3/2014 | Cheng | G06F 1/1632 |
| | | | 361/679.41 |
| 8,780,546 B2* | 7/2014 | Zhou | H01R 27/00 |
| | | | 361/679.41 |
| 2003/0128505 A1* | 7/2003 | Yin | G06F 1/1632 |
| | | | 361/679.41 |
| 2009/0073642 A1 | 3/2009 | Jubelirer et al. | |
| 2010/0073862 A1* | 3/2010 | Carnevali | G06F 1/1632 |
| | | | 361/679.43 |
| 2010/0118485 A1 | 5/2010 | Crooijmans et al. | |
| 2010/0149748 A1* | 6/2010 | Lam | G06F 1/1632 |
| | | | 361/679.41 |
| 2010/0188808 A1 | 7/2010 | Howarth | |
| 2012/0273643 A1* | 11/2012 | Chang | G06F 1/1632 |
| | | | 248/346.06 |
| 2013/0163186 A1* | 6/2013 | Mizusawa | H05K 7/14 |
| | | | 361/679.41 |
| 2013/0277529 A1 | 10/2013 | Bolliger | |
| 2014/0097793 A1 | 4/2014 | Wurtz et al. | |

OTHER PUBLICATIONS

Karthikeyan; "Cygnett Soundwave Bluetooth Speaker and Dock-Review": printed Feb. 25, 2015 from digisecrets.com/gadgets/cygnett-soundwave-bluetooth-speaker-and-dock-rev.

* cited by examiner

DOCKING STATIONS

BACKGROUND

Electronic devices may engage with other devices in a variety of manners. Some electronic devices may engage with docking devices, which may be computing, electric, or non-electric docking devices. Docking devices may provide additional functionality to the electronic device, or improve the function or usability m some way. In some situations, a docking device may hold an electronic device in a certain position. Docking devices may be capable of transmitting and/or receiving power, electrical signals, or both to or from an electronic device with which the docking device is engaged. Further, docking devices may enable electrical communication or power transmission from the electronic device to another, separate component or device.

DETAILED DESCRIPTION

Figure 1A:
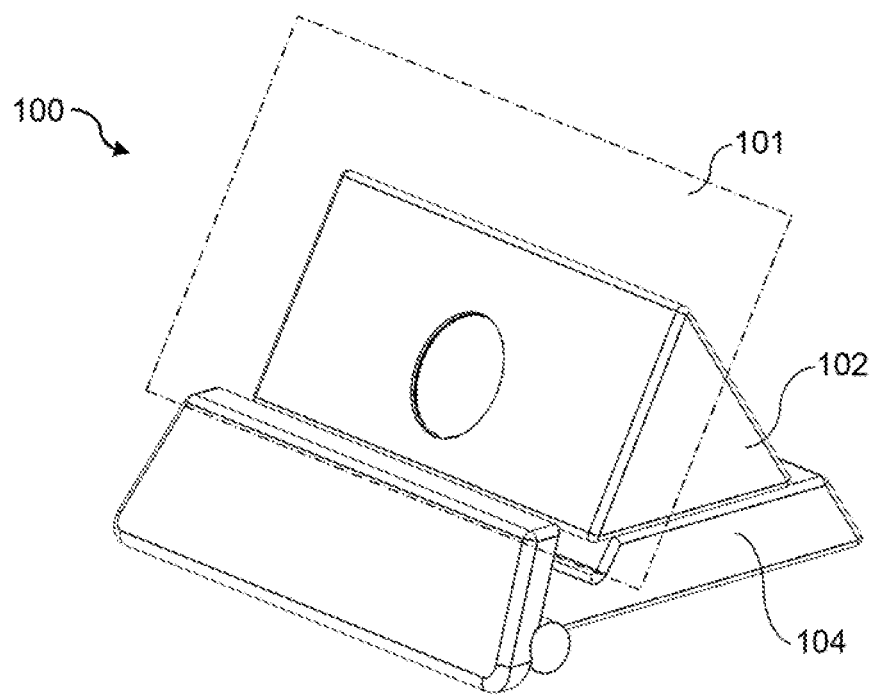
FIG. 1A is a perspective view of an example docking station.

Electronic devices, including personal or mobile electronic devices, which may be computing devices, may engage with accessories, or supplemental devices. These supplemental devices may also be electronic or computing devices. The supplemental devices may, in some situations, be a docking station to structurally support, cradle, or hold the electronic device in a position or orientation. The docking station may be structured such that it may hold or cradle an electronic device of a certain thickness. In some situations, it may be desirable to engage a different, or second electronic device with a docking station such that the second electronic device is held in a certain position. The second electronic device may have a different thickness than the first electronic device, and, as such, the second electronic device may not be engageable with the docking station that is engageable with the first electronic device. The second electronic device, therefore, may be engageable with a different docking station than the first electronic device, the different docking station having an ability to accommodate the different thickness of the second electronic device. In further situations, it may be desirable to engage a third electronic device with a docking station such that the electronic device is held in a certain position, and the third electronic device may even have a different thickness than that of the first or second electronic devices. The third electronic device may, therefore, be engageable with a docking station that is different from the docking stations of the first and second electronic devices. Thus, in some situations, a user may have multiple docking stations to mount multiple electronic devices with different thicknesses.

Further, in some situations, a docking station may be able to accommodate electronic devices of differing thicknesses, however, the docking station might accomplish this by just including an oversized receiving channel or slot for the electronic devices. Therefore, while larger-thickness devices may fit securely, smaller-thickness devices may have a loose engagement with the docking station, and may be insecure. Additionally, another docking station may also be able to accommodate electronic devices of differing thicknesses, and may even be able to do so in a secure manner for all multiple differently-sized devices, however, the docking station may accomplish this by utilizing a complex way of engagement with each device, or may include a relatively large number of parts, each of which may be subject to failure or malfunction.

Implementations of the present disclosure provide docking stations to engage with a device. Examples of docking stations may be able to receive and accommodate multiple electronic devices separately, with one or more of the electronic devices having a thickness that is different from the others. Further, implementations of the present disclosure may be able to receive and accommodate the electronic devices having differing thicknesses in a relatively secure manner. Additionally, the example docking stations described herein may be able to securely receive electronic devices of differing thicknesses, while comprising a relatively simple and reliable structure, having few constituent components.

Figure 1B:
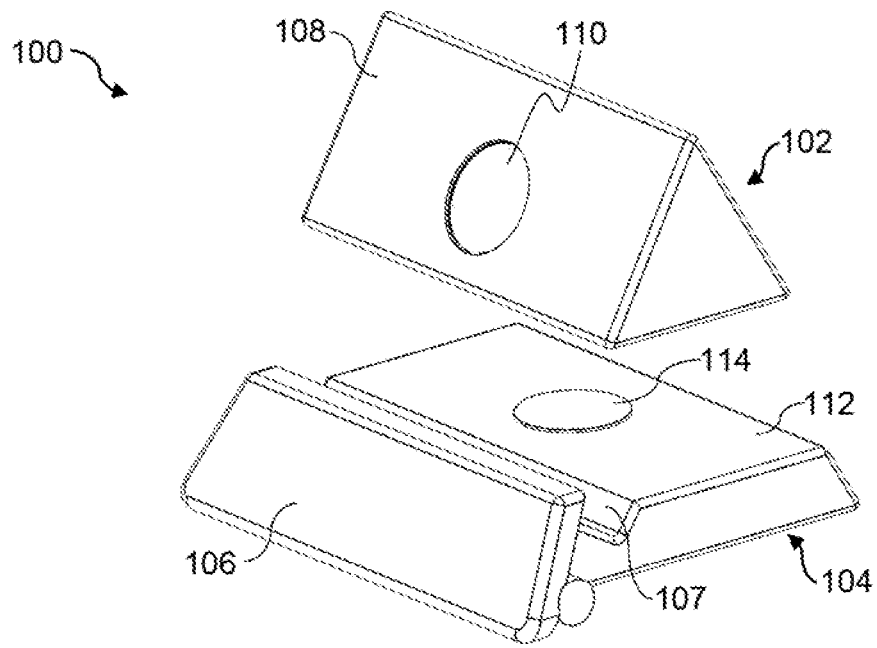
FIG. 1B is a perspective, exploded view of an example docking station.

Referring now to FIG. 1A, a perspective view of an example docking station 100 is illustrated. The docking station 100 may include a rotatable block 102, and a base cradle 104. Referring additionally to FIG. 1B, an exploded, perspective view of the docking station 100 is illustrated. The docking station 100 may be to engage, receive, or accommodate an electronic device 101. The docking station 100 may structurally support the electronic device 101, such that the electronic device is held or cradled in a certain position or orientation. It may be desirable, in some situations, to have the electronic device held in such a position to make it easier for a user to interact, view, or work with and use the electronic device.

The electronic device 101 may be a computing device, in some implementations. The electronic device 101 may comprise a screen on which a user can view applications, videos, images, or other content. Further, the electronic device 101 may comprise one or more computer components such as a motherboard, a hard drive, memory, processors, and input/output communication ports, including a battery charging port. In some situations, the electronic device 101 may include other components not listed above. In some implementations, the electronic device 101 may be a tablet, smartphone, or other mobile computing device. In further implementations, the electronic device 101 may be a portable computer, such as a laptop, or a portion thereof.

The docking station 100 may include a rotatable block 102. The rotatable block 102 may be a rigid or semi-rigid component including multiple sides 108. Each, of the multiple sides 108 may be generally flat such that each of the multiple sides may securely engage with both the electronic device 101 (in a manner illustrated in FIG. 1A, in some implementations), and a mating surface 112 of the base cradle 104. The rotatable block 102 may engage with the base cradle 104 in multiple set positions, wherein each set position includes a different side of the multiple sides 108 engaging with the mating surface 112. In other words, each of the multiple sides 108 is to separately engage with the base cradle 104 in one of the multiple set positions. Each set position may define an insertion slot on the docking station 100 to receive the electronic device 101, and, further, at least one of the multiple set positions may define an insertion slot having a different width from the insertion slot defined by another of the multiple set positions. In other words, the insertion slot may have a different width in at least one of the multiple set positions from another of the multiple set positions. In some implementations, each of the multiple set positions defines an insertion slot having a different width from each of the insertion slots defined by the other multiple set positions. Thus, the insertion slot of the docking station 100 may be able to have the same number of different available widths as the number of the multiple sides 108 of the rotatable block 102. In other words, for example, if the rotatable block 102 has three sides, the insertion slot of the docking station 100 may be able to have three different available widths. In some implementations, the rotatable block 102 may include more than three sides, and thus, the docking station 100 may be able to have an insertion slot with more than three available widths.

Additionally, the rotatable block 102 may have at least one keying feature 110. In some implementations, each of the multiple sides 108 of the rotatable block 102 may have a keying feature 110. In further implementations, the keying features of each of the multiple sides 108 may all be identical. The base cradle 104 may have a complementary keying feature 114, disposed on the mating surface 112, that may separately engage or mate with each of the keying features 110 of the rotatable block 102. The rotatable block. 102 may be hindered or prevented from sliding or translating on the mating surface 112 when the keying feature 110 of the side 108 that is mated to the mating surface 112 is engaged with the complementary keying feature 114 of the base cradle 104. In some implementations, the keying features 110 of the rotatable block 102 may comprise a recess, cavity, or impression in the respective side 108, with the complementary keying feature 114 of the base cradle 104 comprising an oppositely-structured geometry, e.g., a protrusion from the mating surface 112, such that the keying features 110 and the complementary keying feature 114 may mate together. In some implementations, the complementary keying feature 114 may comprise a recess into the mating surface 112, and the keying features 110 may comprise an oppositely-structured geometry, such as a protrusion from each of the multiple sides 108.

The docking station 100 may include a base cradle 104. The base cradle 104 may engage with a desk, counter, shelf, or other surface on which the docking station 100 may be disposed on. The base cradle 104, as described above, may comprise a mating surface 112, upon which one of the multiple sides 108 of the rotatable block 102, may be disposed on or engaged with. The base cradle 104 may also include, in some implementations, a front lip 106. The front lip 106 may define, within the base cradle 104, a partial insertion channel 107. The partial insertion channel 107 may, in some implementations, be disposed adjacent to the mating surface 112 on the base cradle 104. Further, the front lip 106 may define a front surface of the partial insertion channel 107, as is illustrated in FIG. 1B. The rotatable block 102, when having one of the multiple sides 108 mated to or engaged with the mating surface 112, may have another of the multiple sides 108 generally facing the front lip 106. In other words, each of the multiple sides 108 may engage with the base cradle 104 such that another of the multiple sides 108 is generally opposing the front lip 106 to define the insertion slot to receive the electronic device 101 in between the front lip 106 and the opposing side 108. Thus, the from lip 106 and another of the multiple sides 108 may define the front and rear surfaces of the insertion slot, respectively. The distance between the front lip 106 and the opposing side 108 (e.g., the insertion slot width) may depend on the relative location of the keying feature 110 on the side 108 that is engaged with or mated to the mating surface 112. Thus, each of the multiple sides 108 may define an insertion slot with a different width. In some implementations, the opposing side 108 may define the insertion slot along with the partial insertion channel 107, and, further, the insertion slot may receive the electronic device 101 such that a bottom edge of the electronic device 101 may rest within the partial insertion channel 107.

Figures 2A, 2B, 2C:
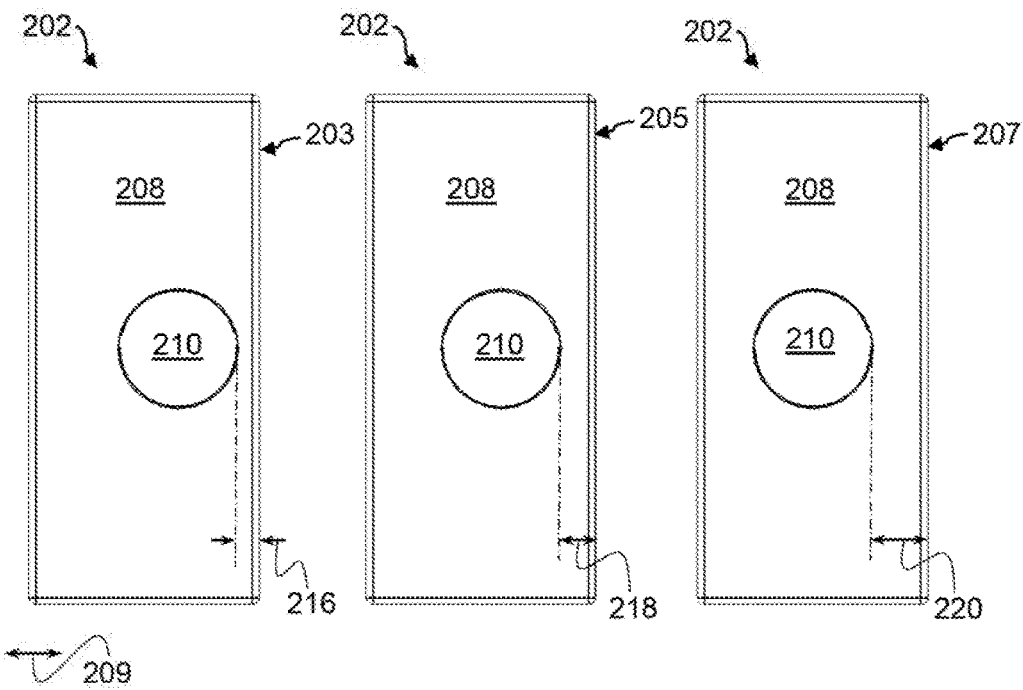
FIG. 2A is a front view of an example side of an example rotatable block of an example docking station.
FIG. 2B is a front view of an example side of an example rotatable block of an example docking station.
FIG. 2C is a flout view of an example side of an example rotatable block of an example docking station.

Referring now to FIGS. 2A-C, a front view of each of three example sides 208 of an example rotatable block 202 of an example docking station is illustrated. Rotatable block 202 may be similar to rotatable block 102. Further, the similarly named elements of rotatable block 202 may be similar in function and/or structure to the elements of rotatable block 102, as they are described above. Each of the example side surfaces 208 of the rotatable block 202 may include a keying feature 210. Each keying feature 210 may have an offset distance from a reference edge of the rotatable block 202. In FIG. 2A, keying feature 210 has an offset distance 216 from reference edge 203. In FIG. 2B, another example side may have a keying feature 210 with an offset distance 218 from a reference edge 205. Finally, in FIG. 2C, a third example side may have a keying feature 210 with an offset distance 220 from a reference edge 207. Thus, each keying feature 210 of the rotatable block. 202 may have a different offset distance from a reference edge. In other implementations, one keying feature may have the same offset distance from a reference edge as another keying feature. Each reference edge may be the adjacent edge immediately to the right of the keying feature 210 of the respective side 208, as illustrated in FIGS. 2A-C. The edge immediately to the left of each keying feature 210 may, in other implementations, represent the reference edge, as long as it is used for the reference edge for each of the multiple sides 208.

Referring still to FIGS. 2A-C, offset distance 216 may be smaller than offset distance 218, which, in turn, may be smaller than offset distance 220. This illustrates that the keying feature 210 of each side may be in a relatively different location along reference direction 209 on the respective side 208, as compared to the location of the keying features 210 on the other sides 208.

Figure 2D:
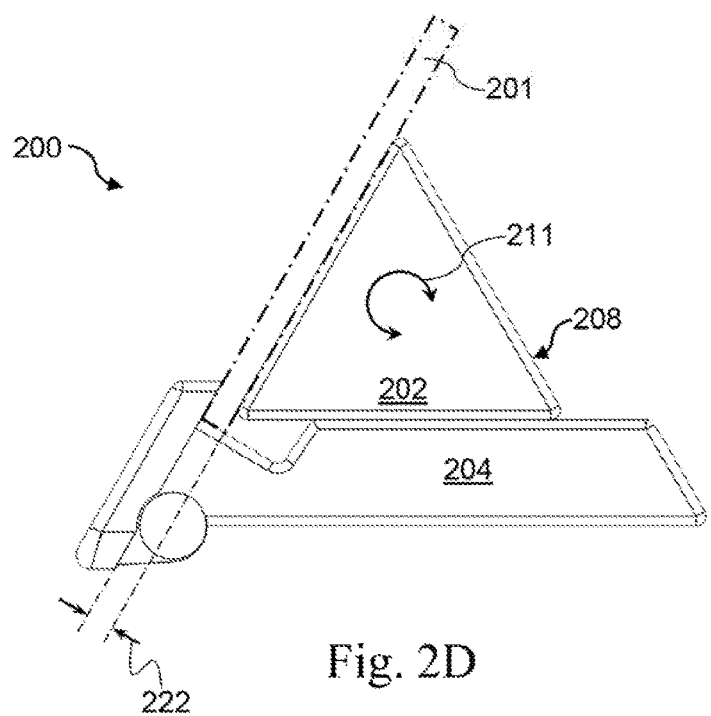
FIG. 2D is a side view of an example docking station.
Figure 2E:
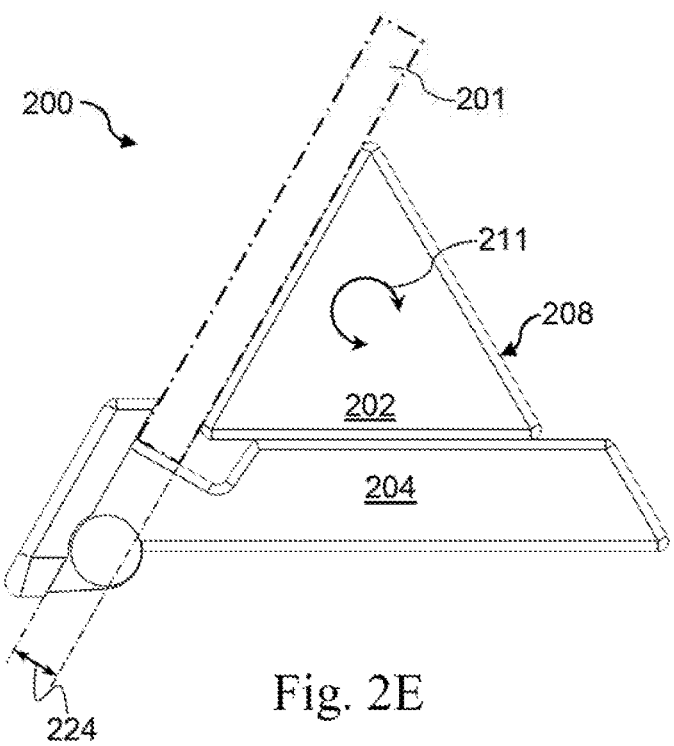
FIG. 2E is a side view of an example docking station.
Figure 2F:
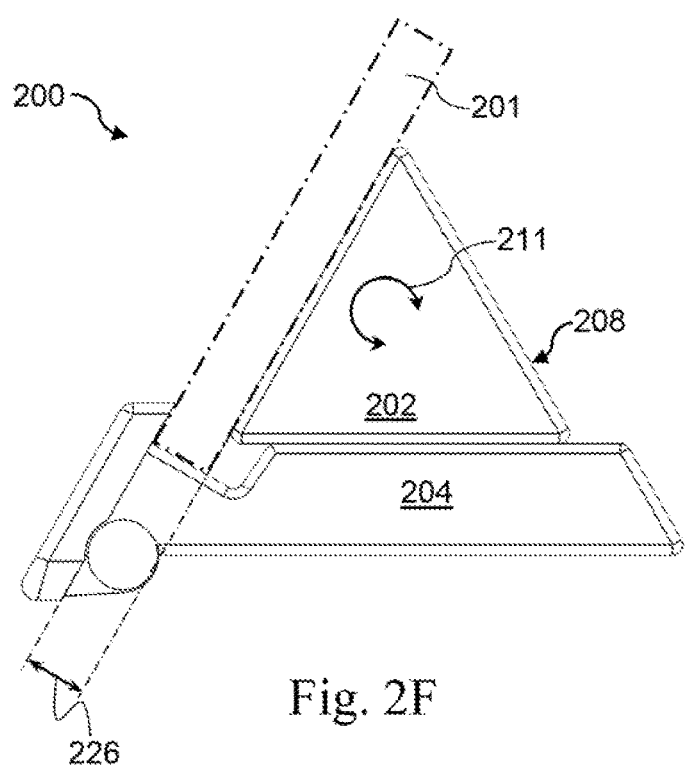
FIG. 2F is a side view of an example docking station.

Referring additionally now to FIGS. 2D-F, a side view of an example docking station 200 is illustrated. Docking station 200 may be similar to docking station 100. Further, the similarly named elements of docking station 200 may be similar in function and/or structure to the elements of docking station 100, as they are described above. Docking station 200 may comprise an example rotatable block 202, as described above with reference to FIGS. 2A-C. Docking station 200 may also include an example base cradle 204, with which each side 208 of the rotatable block 202 may engage. FIG. 2D illustrates the rotatable block 202, in a first set position with the base cradle 204, defining an insertion slot having a width 222. The width 222 of the insertion slot may be sized such that the insertion slot of the docking station 200 may receive an electronic device 201 having a thickness that is suitable for width 222. The width 222 may be defined by a complementary keying feature of the base cradle engaging with the keying feature 210 having an offset distance 216, as shown in FIG. 2A.

Similarly, FIG. 2E illustrates the rotatable block 202, in a second set position with the base cradle 204, defining an insertion slot having a width 224. The width 224 of the insertion slot may be sized such that the insertion slot of the docking station 200 may receive an electronic device 201 having a thickness that is suitable for width 224. The width 224 may be defined by a complementary keying feature of the base cradle engaging with the keying feature 210 having an offset distance 218, as shown in FIG. 2B.

FIG. 2F illustrates the rotatable block 202, in a third set position with the base cradle 204, defining an insertion slot having a width 226. The width 226 of the insertion slot may be sized such that the insertion slot of the docking station 200 may receive an electronic device 201 having a thickness that is suitable for width 226. The width 226 may be defined by a complementary keying feature of the base cradle engaging with the keying feature 210 having an offset distance 220, as shown in FIG. 2C. Like the respective offset distances, insertion slot width 222 may be smaller than insertion slot width 224, which, in turn, may be smaller than insertion width 226.

Therefore, FIGS. 2D-F illustrate that an example docking station 200 may have the capability to separately receive three different electronic devices 201 within an insertion slot of the docking station 200, each electronic device 201 having a different thickness. In order to change the width of the insertion slot to receive an electronic device 201 of a different thickness, the rotatable block 202 may be rotated relative to the base cradle 204 generally along direction 211, from one set position to the next, such that the complementary keying feature of the base cradle 204 is engaged with the keying feature 210 of a different side 208. The different offset distance of the keying feature 210 of the newly-engaged side 208 will enable the rotatable block 202 to define an insertion slot having a different width.

Each example side 208 may represent one side of the multiple sides of an example rotatable block 202 having three sides. In some implementations, the three sides 208 give the rotatable block 202 a geometry of a triangle. In further implementations, the rotatable block 202 may comprise a geometry of that of an equilateral triangle. Each side 208 of such an implementation may define an insertion slot that is generally angled at 60 degrees from a horizontal plane of the docking station.

It should be understood that, in other implementations, the rotatable block may comprise more or less than three sides. An example of a rotatable block having less than three sides may be a rotatable block comprising the geometry of a cylinder. In such an implementation, it may be understood that the cylindrical rotatable block may still have multiple keying features 210 disposed around the circumferential surface area of the cylinder, providing the ability for the cylindrical block to engage with a base cradle in multiple set positions, as described above, and, therefore, having the ability to define insertion slots of differing widths.

Figure 3:
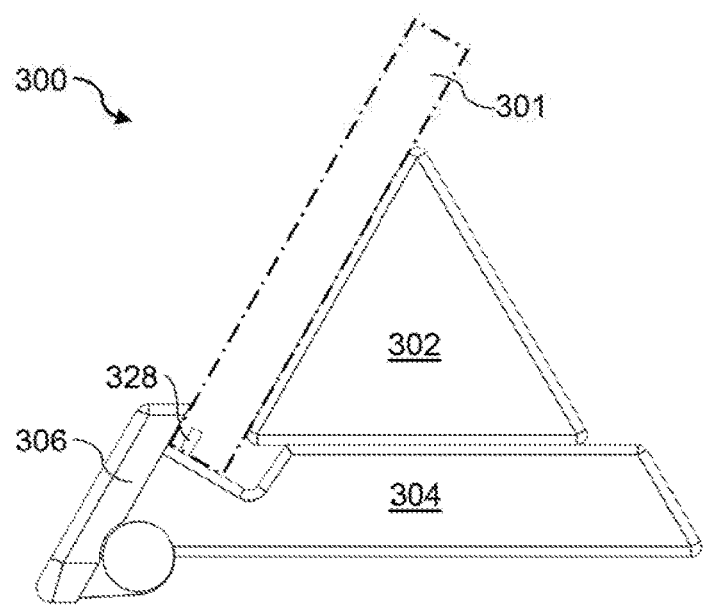
FIG. 3 is a side view of an example docking station.

Referring now to FIG. 3, a side view of an example docking station 300 is illustrated. Docking station 300 may be similar to docking station 100 or 200. Further, the similarly named elements of docking station 300 may be similar in function and/or structure to the elements of docking station 100 or 200, as they are described above. Docking station 300 may comprise a rotatable block 302 and a base cradle 304. Rotatable block 302 may be engageable with base cradle 304 in multiple set positions to define an insertion slot that has multiple available widths. The docking station 300 may receive an electronic device 301 within the insertion slot. The docking station 300 may further comprise a communication port 328 disposed on the base cradle 304, and, more specifically, may be disposed within the insertion slot. The communication port 328 may engage with the electronic device 301. In some implementations, the communication port 328 may provide a charging current to the electronic device 301, to charge an internal battery of the electronic device 301. In further implementations, the communication port 328 may transfer to or receive from the electronic device 301, electronic communication signals. The communication port 328 may be a male electrical connector to engage with a complementary female connector. The communication port 328 may be a standard electronic communications port, in some implementations, such as a Universal Serial Bus (USB) port.

In some implementations, the communication port 328 may be fixed to the base cradle 304 relative to a front lip 306 of the base cradle 304. In other words, the communication port 328 may be disposed within the insertion slot in a fixed orientation and distance relative to the front lip 306 of the base cradle 304. In some implementations, the electronic device 301 and similar electronic devices 301 having differing thicknesses, each to engage with the insertion slot of the docking station 300, may each include a complementary communication port to engage with the communication port 328 of the docking station 300. The communication port 328 may be to engage with the complementary communication port on the electronic device 301 that is engaged with the docking station 300, regardless of the thickness of the engaged device 301, and/or regardless of the side 308 of the rotatable block 302 that is used to define the insertion slot of the docking station 300 for the electronic device 301.

Figure 4:
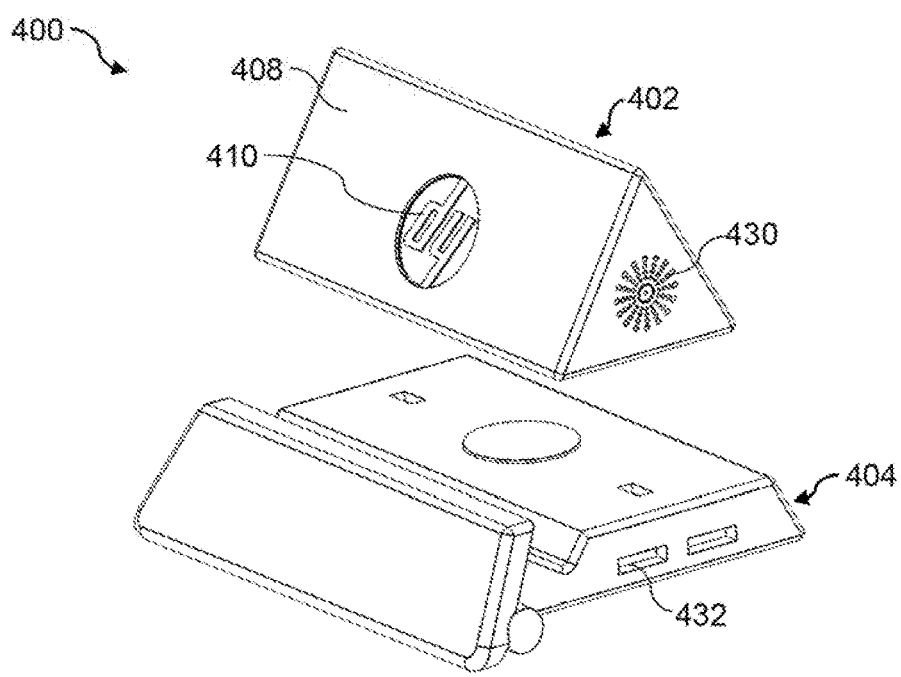
FIG. 4 is a perspective, exploded view of an example docking station.

Referring now to FIG. 4, a perspective, exploded view of an example docking station 400 is illustrated. Docking station 400 may be similar to any above-described docking station. Further, the similarly named elements of docking station 400 may be similar in function and/for structure to the elements of the above-described docking stations. The docking station 400 may include a rotatable block 402 to engage with a base cradle 404 in multiple set positions. Each set position may define an insertion slot having a different width, each to receive an electronic device having a different thickness. The rotatable block 402 may comprise multiple sides 408, each side including a keying feature 410 to engage with a complementary keying feature of the base cradle 404. In some implementations, the keying feature 410 may include at least one recessed portion, and at least one protruding portion. In further implementations, the recessed and protruding portions may form an embossed design or logo on the keying feature. The complementary keying feature on the base cradle 404 may comprise a mating geometry to that of the keying features 410.

In some implementations, the rotatable block 402 may include an integral computer accessory 430. The integral computer accessory may engage with the electronic device that is engaged with the docking station 400. In some implementations, the integral accessory may engage or communicate with the electronic device through a communication port disposed in the insertion slot of the base cradle 404. In further implementations, the integral accessory 430 may be a speaker. The speaker may emit sounds generated from a signal from the electronic device. In yet further implementations, the speaker may be a speaker having Bluetooth connectivity to the electronic device.

The docking station 400 may further include one or more external communication ports 432. The external communication ports 432 may transfer to or receive from the electronic device, electronic communication signals. Further, the external communication ports 432 may enable an external device charger to provide charging current to the electronic device that is engaged with the docking station 400. The communication ports 432 may be female electrical connectors, each to engage with a complementary male connector. The communication ports 432 may each be a standard electronic communications port, in some implementations, such as a Universal Serial Bus (USB) port.

What is claimed is:

1. A device docking station, comprising:
   a base cradle; and
   a rotatable block to engage with the base cradle in multiple set positions to define an insertion slot having a varying width to engage with an electronic device;
   wherein the insertion slot has a different width in at least one of the multiple set positions from another of the multiple set positions;
   wherein the rotatable block includes multiple sides, wherein each of the multiple sides is to engage with the base cradle in one of the multiple set positions;
   wherein each of the multiple sides of the rotatable block includes a keying feature, and the base cradle includes a complementary keying feature that can separately engage with each of the keying features of the rotatable block, wherein each keying feature has a different offset distance from an edge of the rotatable block.

2. The device docking station of claim 1, wherein the rotatable block includes three sides, wherein each of the three sides defines an insertion slot with a different width when engaged in the respective set position.

3. The device docking station of claim 2, wherein the rotatable block comprises a geometry of a generally equilateral triangle, and wherein each of the three sides defines an insertion slot that is generally 60 degrees from a horizontal plane.

4. The device docking station of claim 3, wherein the rotatable block includes an accessory to engage with the electronic device.

5. A device docking station, comprising:
   a base cradle having a front lip; and
   a rotatable block having multiple sides,
   wherein each of the multiple sides can engage with the base cradle such that another of the multiple sides is generally opposing the front lip to define an insertion slot to receive an electronic device in between the front lip and the opposing side, and wherein each of the multiple sides defines an insertion slot with a different width;
   wherein the rotatable block includes an accessory to engage with the electronic device.

6. The device docking station of claim 5, wherein the base cradle includes a communication port to engage with the electronic device, wherein the communication port is disposed within the insertion slot and in a fixed orientation and distance relative to the front lip.

7. The device docking station of claim 6, wherein the communication port is to engage with the electronic device within the insertion slot when any one of the multiple sides defines the insertion slot.

8. The device docking station of claim 5, wherein each of the multiple sides includes a keying feature that is to engage with a complementary keying feature disposed on the base cradle.

9. The device docking station of claim 8, wherein each of the keying features of the multiple sides has a different offset distance from an edge of the respective side, and wherein the offset distance of the keying feature on the side engaged with the base cradle is to define the width of the defined insertion slot.

10. A device docking station, comprising:
    a base cradle having a partial insertion channel; and
    a rotatable block having multiple sides,
    wherein each of the multiple sides is to separately engage with the base cradle such that another of the multiple sides defines an insertion slot, with the partial insertion channel, to receive an electronic device, and
    wherein each of the multiple sides is to define an insertion slot having a different width;
    wherein the rotatable block includes an accessory to engage with the electronic device.

11. The device docking station of claim 10, wherein the base cradle includes a front lip, and wherein the front lip and the another of the multiple sides define the front and rear surfaces of the insertion slot, respectively.

12. The device docking station of claim 11, wherein each of the multiple sides includes a keying feature having a different offset distance from an edge of the respective side.

13. The device docking station of claim 12, wherein each keying feature is to separately engage with a complementary keying feature on the base cradle, wherein the offset distance of each keying feature is to determine the width of the respective defined insertion slot.

* * * * *